(12) United States Patent
Lowans et al.

(10) Patent No.: US 9,148,225 B2
(45) Date of Patent: Sep. 29, 2015

(54) OPTICAL TRANSMITTERS AND RECEIVERS FOR QUANTUM KEY DISTRIBUTION

(75) Inventors: Brian Sinclair Lowans, Malvern (GB); Richard Michael Jenkins, Malvern (GB); Ewan David Finlayson, Malvern (GB)

(73) Assignee: QINETIQ LIMITED, London (GB)

( * ) Notice: Subject to any disclaimer, the term of this patent is extended or adjusted under 35 U.S.C. 154(b) by 168 days.

(21) Appl. No.: 12/863,509

(22) PCT Filed: Jan. 23, 2009

(86) PCT No.: PCT/GB2009/000179
§ 371 (c)(1),
(2), (4) Date: Jul. 19, 2010

(87) PCT Pub. No.: WO2009/095644
PCT Pub. Date: Aug. 6, 2009

(65) Prior Publication Data
US 2010/0290626 A1    Nov. 18, 2010

Related U.S. Application Data

(60) Provisional application No. 61/023,966, filed on Jan. 28, 2008.

(30) Foreign Application Priority Data

Jan. 28, 2008 (GB) .................... 0801492.0

(51) Int. Cl.
*H04L 9/08* (2006.01)
*H04B 10/00* (2013.01)
*H04B 10/70* (2013.01)

(52) U.S. Cl.
CPC ............... *H04B 10/30* (2013.01); *H04B 10/70* (2013.01)

(58) Field of Classification Search
CPC ................................. H04B 10/70; H04B 10/30
USPC ................... 385/4.9, 11, 15, 28, 88; 380/278
See application file for complete search history.

(56) References Cited

U.S. PATENT DOCUMENTS

| | | | | |
|---|---|---|---|---|
| 3,704,996 A * | 12/1972 | Borner et al. | .................. | 385/38 |
| 4,291,939 A | 9/1981 | Giallorenzi et al. | | |
| 4,691,984 A | 9/1987 | Thaniyavarn | | |
| 4,775,971 A | 10/1988 | Bergmann | | |
| 4,807,952 A | 2/1989 | Jaeger et al. | | |

(Continued)

FOREIGN PATENT DOCUMENTS

| | | |
|---|---|---|
| EP | 0 583 115 A1 | 2/1994 |
| EP | 0 610 727 A1 | 8/1994 |

(Continued)

OTHER PUBLICATIONS

Phil. Trans; Hollow-core photonic bandgap fibre: new light guidance for new science and technology; Year: 2006; aaas.org pp. 3439-3462.*

(Continued)

*Primary Examiner* — Monjour Rahim
(74) *Attorney, Agent, or Firm* — Oliff PLC

(57) ABSTRACT

An optical receiver for a quantum key distribution system comprises a plurality of optical components mounted or formed in a substrate and optically coupled by one or more hollow core waveguides formed in the substrate.

20 Claims, 6 Drawing Sheets

(56) References Cited

U.S. PATENT DOCUMENTS

Figure 1:
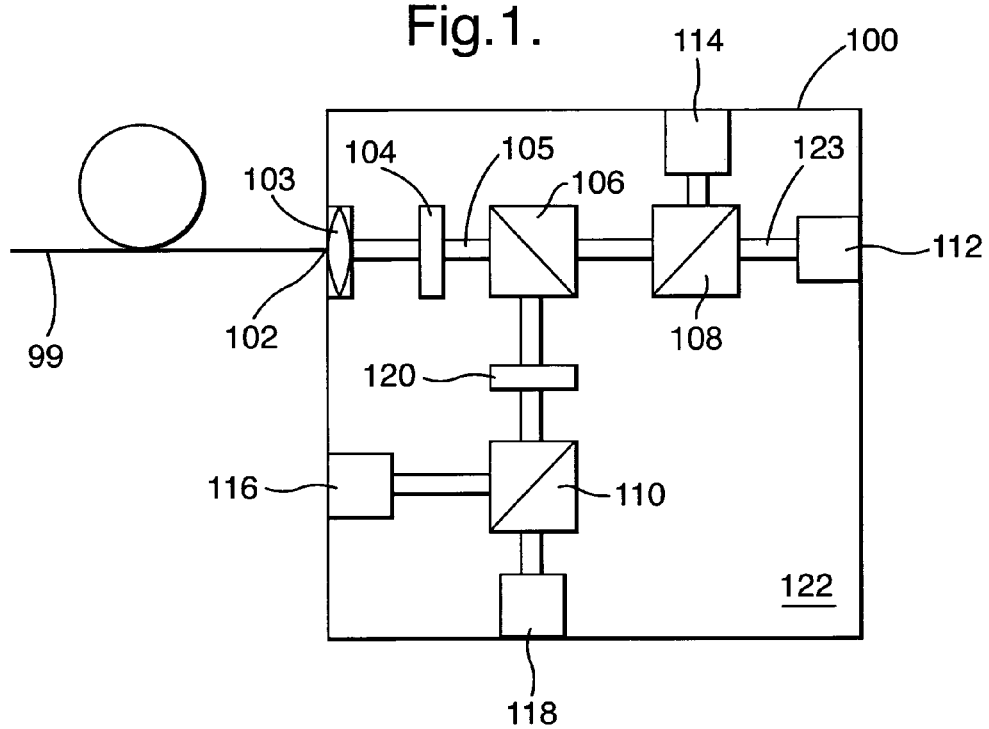

| | | |
|---|---|---|
| 4,846,540 A | 7/1989 | Kapon |
| 5,150,436 A | 9/1992 | Jaeger et al. |
| 5,157,754 A | 10/1992 | Bierlein et al. |
| 5,166,991 A | 11/1992 | Jaeger et al. |
| 5,410,625 A | 4/1995 | Jenkins et al. |
| 5,414,789 A | 5/1995 | Tamil et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,644,664 A * | 7/1997 | Burns et al. ............... 385/2 |
| 5,732,139 A | 3/1998 | Lo et al. |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A * | 2/2000 | Rarity et al. ............... 380/256 |
| 6,145,079 A | 11/2000 | Mitty et al. |
| 6,240,514 B1 | 5/2001 | Inoue et al. |
| 6,278,548 B1 | 8/2001 | Shimano et al. |
| 6,717,708 B2 | 4/2004 | Prosyk |
| 6,798,795 B2 | 9/2004 | Yoo |
| 6,806,986 B2 | 10/2004 | Asobe et al. |
| 7,068,790 B1 | 6/2006 | Elliott |
| 7,130,493 B2 | 10/2006 | Heaton et al. |
| 7,155,078 B2 | 12/2006 | Welch et al. |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 * | 7/2007 | Beal et al. ............... 380/256 |
| 7,274,791 B2 | 9/2007 | Van Enk |
| 7,289,688 B2 | 10/2007 | Bull et al. |
| 7,327,432 B2 | 2/2008 | Skjonnemand |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 | 9/2009 | Han et al. |
| 7,627,126 B1 | 12/2009 | Pikalo et al. |
| 7,646,873 B2 | 1/2010 | Lee et al. |
| 7,706,535 B1 | 4/2010 | Pearson et al. |
| 7,760,883 B2 | 7/2010 | Kuang |
| 7,864,958 B2 | 1/2011 | Harrison et al. |
| 7,865,048 B2 | 1/2011 | McCaughan et al. |
| 8,054,976 B2 * | 11/2011 | Harrison et al. ............... 380/278 |
| 8,081,270 B2 | 12/2011 | Lazarev |
| 8,488,790 B2 | 7/2013 | Wellbrock et al. |
| 2002/0025046 A1 | 2/2002 | Lin |
| 2002/0060760 A1 | 5/2002 | Weiner |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0032954 A1 | 2/2004 | Bonfrate et al. |
| 2004/0034776 A1 | 2/2004 | Fernando et al. |
| 2004/0086229 A1 | 5/2004 | Ahn et al. |
| 2004/0109564 A1 | 6/2004 | Cerf et al. |
| 2004/0184603 A1 | 9/2004 | Pearson et al. |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0135620 A1 | 6/2005 | Kastella et al. |
| 2005/0190921 A1 | 9/2005 | Schlafer et al. |
| 2005/0249352 A1 | 11/2005 | Choi et al. |
| 2005/0259825 A1 | 11/2005 | Trifonov |
| 2005/0286723 A1 | 12/2005 | Vig et al. |
| 2006/0002563 A1 | 1/2006 | Bussieres et al. |
| 2006/0008227 A1 * | 1/2006 | Schmidt et al. ............... 385/129 |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0104592 A1 | 5/2006 | Jenkins et al. |
| 2006/0290941 A1 * | 12/2006 | Kesler et al. ............... 356/491 |
| 2007/0014415 A1 | 1/2007 | Harrison et al. |
| 2007/0016534 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1 | 7/2007 | Blom et al. |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 | 1/2008 | Tajima et al. |
| 2008/0031456 A1 | 2/2008 | Harrison et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 * | 12/2008 | Stepanov et al. ............... 385/132 |
| 2009/0016736 A1 | 1/2009 | Beal et al. |
| 2009/0074192 A1 | 3/2009 | Beal et al. |
| 2009/0106551 A1 | 4/2009 | Boren et al. |
| 2009/0175452 A1 | 7/2009 | Gelfond et al. |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0293380 A1 | 11/2010 | Wiseman et al. |
| 2010/0299526 A1 | 11/2010 | Wiseman et al. |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 2 081 317 A2 | 6/2005 |
| EP | 1 605 287 A2 | 12/2005 |
| EP | 1 633 076 A1 | 3/2006 |
| EP | 1 643 663 A1 | 5/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-63-313120 | 12/1988 |
| JP | A-04-233518 | 8/1992 |
| JP | 8-076148 A | 3/1996 |
| JP | A-2000-295175 | 10/2000 |
| JP | A-2004-520614 | 7/2004 |
| JP | A-2005-117511 | 4/2005 |
| JP | A-2005-268958 A | 9/2005 |
| JP | A-2006-013573 | 1/2006 |
| JP | A-2007-500370 A | 1/2007 |
| JP | A-2007-053591 | 3/2007 |
| JP | A-2007-129562 | 5/2007 |
| WO | WO 92/11550 A1 | 7/1992 |
| WO | WO 92/11551 A1 | 7/1992 |
| WO | WO 92/11554 A2 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 02/057844 A1 | 7/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |

(56) References Cited

FOREIGN PATENT DOCUMENTS

| | | |
|---|---|---|
| WO | WO 2006/031828 A2 | 3/2006 |
| WO | WO 2006/134290 A3 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

John P. Barber; Integrated hollow and solid-core waveguides for sensor platforms; Year:2005; OSA/IPRA; p. 1-3.*

Office Action dated May 11, 2012 issued in U.S. Appl. No. 12/812,849.

Stucki et al., "Quantum Key Distribution Over 67km With Plug &Play System," New Journal of Physics 4, pp. 41.1-41.8, 2002.

Yin, D. et al., "Integrated ARROW Waveguides With Hollow Cores," Optics Express, Jun. 14, 2004, pp. 2710-2715, vol. 12, No. 12, published by the Optical Society of America, USA.

Horikiri, T. et al., "Quantum Key Distribution With a Heralded Single Photon Source," *International Quantum Electronics Conference*, Jul. 11, 2005, pp. 1617-1618.

Nambu, Y. et al., "BB84 Quantum Key Distribution System Based on Silica-Based Planar Lightwave Circuits," *Japanese Journal of Applied Physics*, 2004, pp. 1-11, vol. 43, No. 8B.

Gordeev, N.Y. et al., "Tunable Electro-Optic Polarization Modulator for Quantum Key Distribution Applications," *Optics Communications*, 2004, pp. 203-210, vol. 234, No. 1-6.

Masanovic, M.L. et al., "Design and Performance of a Monolithically Integrated Widely Tunable All-Optical Wavelength Converter With Independent Phase Control," *IEEE Photonics Technology Letters*, Oct. 2004, pp. 2299-2301, vol. 16, No. 10.

Bennett, C.H. et al., "Quantum Cryptography: Public Key Distribution and Coin Tossing," *International Conference on Computers, Systems and Signal Processing*, Dec. 10-12, 1984, pp. 175-179.

Great Britain Search Report issued in British Application No. 0801492.0 on Apr. 24, 2008.

International Search Report issued in International Application No. PCT/GB2009/000179 on Jun. 2, 2009.

International Preliminary Report on Patentability issued in International Application No. PCT/GB2009/000179 on Aug. 3, 2010.

Jun. 1, 2011 International Search Report issued in Application No. PCT/GB2010/001811.

Jun. 1, 2011 Written Opinion issued in Application No. PCT/GB2010/001811.

Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.

Bechmann-Pasquinucci et al., "Quantum key distribution with trusted quantum relay," May 12, 2005, pp. 1-13, <http://arxiv.org/PS_cache/quant-ph/pdf/0505/0505089v1.pdf>.

Duligall et al., "Low cost and compact quantum key distribution," New Journal of Physics 8, 249, pp. 1-16, 2006.

Elliott, "Building the quantum network," New Journal of Physics 4, pp. 46.1-46.12, 2002, XP-002271991.

Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.

Fernandez et al., "Passive Optical Network Approach to Gigahertz-Clocked Multiuser Quantum Key Distribution," Journal of Quantum Electronics, vol. 43, No. 2, pp. 130-138, Feb. 2007.

Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep1&type=pdf>.

Lee et al., "Quantum Authentication and Quantum Key Distribution Protocol," Jan. 11, 2006, pp. 1-8, <http://arxiv.org/PS_cache/quant-ph/pdf/0510/0510144v2.pdf>.

Rao et al., "Nonlinear frequency conversion in semiconductor optical waveguides using birefringent, modal and quasi-phase-matching techniques," Journal of Optics A: Pure and Applied Optics, vol. 6, pp. 569-584, 2004.

Karlsson et al., "Authority-based user authentication in quantum key distribution," Physical Review A, vol. 62, pp. 022305-1-022305-7, 2000, XP-002534291.

Kuhn, "A Quantum Cryptographic Protocal with Detection of Compromised Server," Quantum Information and Computation, vol. 5, No. 7, pp. 551-560, 2005, XP-002520284.

Kumavor et al., "Comparison of Four Multi-User Quantum Key Distribution Schemes Over Passive Optical Networks," Journal Of Lightwave Technology, vol. 23, No. 1, pp. 268-276, Jan. 2005, XP-001227328.

Malis et al., "Improvement of second-harmonic generation in quantum-cascade lasers with true phase matching," Applied Physics Letters, vol. 84, No. 15, pp. 2721-2723, Apr. 12, 2004.

Menezes, Handbook of Applied Cryptography, Chapter 13 Key Management Techniques, CRC Press LLC, pp. 547-553, 1997, XP-002520285.

Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.

Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.

Nguyen et al., "802.11i Encryption Key Distribution Using Quantum Cryptography," Journal of Networks, vol. 1, No. 5, pp. 9-20, Sep./Oct. 2006, XP-002576733.

Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.

Jäger et al., "Modal dispersion phase matching over 7 mm length in overdamped polymeric channel waveguides," Applied Physics Letters, vol. 69, No. 27, pp. 4139-4141, Dec. 30, 1996.

Yariv, "Coupled-Mode Theory for Guided-Wave Optics," IEEE Journal of Quantum Electronics, vol. QE-9, No. 9, pp. 919-933, Sep. 1973.

Rahmatian, "An Ultrahigh-Speed AlGaAs—GaAs Polarization Converter Using Slow-Wave Coplanar Electrodes," IEEE Photonics Technology Letters, vol. 10, No. 5, pp. 675-677, May 1998.

Finlayson et al., "Polarization Conversion in Passive Deep-Etched GaAs/AlGaAs Waveguides," Journal of Lightwave Technology, vol. 24, No. 3, pp. 1425-1432, Mar. 2006, XP-002459136.

Grossard et al., "AlGaAs—GaAs Polarization Converter with Electrooptic Phase Mismatch Control," IEEE Photonics Technology Letters, vol. 13, No. 8, pp. 830-832, Aug. 2001.

Hall et al., "Optical Guiding and Electro-Optic Modulation in GaAs Epitaxial Layers," Optics Communications, vol. 1, No. 9, pp. 403-405, Apr. 1970.

Haxha et al., "Analysis of polarization conversion in AlGaAs/GaAs electrooptic polarization converte," Optics Communications, vol. 262, pp. 47-56, 2006, XP-002459135.

Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.

Izuhara et al., "Low-voltage tunable TE/TM converter on ion-sliced lithium niobate thin film," Electronic Letters, vol. 39, No. 15, Jul. 24, 2003.

(56) References Cited

OTHER PUBLICATIONS

Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electooptic Waveguide Modulators at $\lambda=1.3$ μm," Journal of Lightwave Technology, vol. 6, No. 6, pp. 758-771, Jun. 1988.
Mar. 31, 2009 International Search Report issued in Application No. PCT/GB2009/000190.
Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Jun. 2, 2009 Written Opinion issued in Application No. PCT/GB2009/000179.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,146, filed Nov. 17, 2010; Hicks.
U.S. Appl. No. 12/993,098, filed Nov. 17, 2010; Wiseman et al.
U.S. Appl. No. 12/992,695, filed Nov. 15, 2010; Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Gordeev et al., "Tunable electro-optic polarization modulator for quantum key distribution applications," Optics Communications 234 (2004) pp. 203-210.
Haxha et al., "Analysis of polarization conversion in AlGaAs/GaAs electrooptic polarization converter," Optics Communications 262 (2006) pp. 47-56.
Apr. 9, 2012 Office Action issued in Japanese Patent Application No. 2009-527883 (with English Translation).
U.S. Appl. No. 13/496,324, filed Mar. 15, 2012.
U.S. Appl. No. 12/993,098, filed Nov. 17, 2010.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Ibrahim et al. "Simulation of Static Optical XPM in Active MMI Couplers" (published in International Conference on Numerical Simulation of Optoelectronic Devices, Sep. 2007).
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jul. 8, 2013 Office Action issued in U.S. Appl. No. 13/496,324.
Apr. 30, 2013 Office Action issued in Japanese Patent Application No. 2010-543567 (with English Translation).
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Nov. 5, 2013 Office Action issued in U.S. Appl. No. 12/863,510.
Nov. 7, 2013 Office Action issued in U.S. Appl. No. 12/993,098.
Ma et al, Experimental Demonstration of an Active Quantum Key Distribution Network with Over Gbps Clock Synchronization (published in IEEE Communications Letters, vol. 11, No. 12, Dec. 2007).
Mar. 25, 2013 Office Action issued in U.S. Appl. No. 12/310,922.
Jan. 17, 2014 Notice of Allowance issued in U.S. Appl. No. 13/130,944.
Feb. 19, 2014 Notice of Allowance issued in U.S. Appl. No. 12/992,695.
Fung, Chi-hang Fred et al. "Security proof of quantum key distribution with detection efficiency mismatch," Jan. 2009, pp. 131-165, vol. 9, No. 1&2, Rinton Press.
Apr. 7, 2014 Office Action issued in U.S. Appl. No. 12/812,849.
May 8, 2015 Office Action issued in U.S. Appl. No. 13/990,230.
Ross, S., "A Method of Authentication for Quantum Networks," Proceedings of World Academy of Science, Engineering and Technology, vol. 12, (2006).
Oct. 4, 2012 Office Action issued in U.S. Appl. No. 12/992,695.
Oct. 29, 2012 Office Action issued in U.S. Appl. No. 12/993,146.
Sep. 17, 2012 Office Action issued in U.S. Appl. No. 12/310,922.
Nov. 8, 2012 Office Action issued in U.S. Appl. No. 12/863,510.
Nov. 9, 2012 Office Action issued in U.S. Appl. No. 13/130,790.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
May 16, 2008 Search Report issued in International Application No. GB0801408.6.
Apr. 24, 2008 Search Report issued in International Application No. GB0801492.0.

(56) References Cited

OTHER PUBLICATIONS

May 21, 2008 Search Report issued in International Application No. GB0801395.5.
May 21, 2008 Search Report issued in International Application No. GB0801406.0.
Aug. 31, 2008 Search Report issued in International Application No. GB0801406.0.
Sep. 2, 2008 Search Report issued in International Application No. GB0801406.0.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 15, 2012 Office Action issued in U.S. Appl. No. 12/863,483.
Aug. 1, 2012 Office Action issued in U.S. Appl. No. 12/993,098.
Jun. 21, 2012 Office Action issued in U.S. Appl. No. 12/863,510.
U.S. Appl. No. 13/496,324 in the name of Ayling, filed Mar. 15, 2012.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,483 in the name of Wiseman, filed Jul. 19, 2010.
Sep. 21, 2012 Office Action issued in U.S. Appl. No. 12/812,849.

* cited by examiner

Polarisation
Direct Intensity Modulation

Indirect Intensity Modulation

OPTICAL TRANSMITTERS AND RECEIVERS FOR QUANTUM KEY DISTRIBUTION

The invention relates to the field of quantum cryptography (QC) in general, and to optical transmitters and receivers for quantum key distribution (QKD) in particular.

In an optical QC system based on the BB84 protocol for example (see "Quantum cryptography: public key distribution and coin tossing" by C. H. Bennett and G. Brassard, Proc. IEEE International Conference on Computers, Systems and Signal Processing, Bangalore, pp 175-179, 1984) a typical optical receiver incorporates two receiver channels each of which can detect a photon polarised in one of a pair of orthogonal polarisation states and distinguish the polarisation state of the photon. The two pairs of polarisation states (one associated with each channel) are normally mutually inclined at 45°. In establishing a key, an initial step is to assign received photons to one or other of the two receiver channels at random.

This type of optical receiver requires very accurate alignment of optical components in free-space by manual adjustment and is therefore time-consuming and expensive to produce. Construction of such a receiver generally involves use of opto-mechanical mounts, or careful gluing of optical components to achieve the necessary alignment tolerances. Production of such receivers is therefore presently limited to a few units per person per hour and their lack of mechanical robustness makes them unsuited to practical use.

In one aspect, the present invention provides an optical receiver for a quantum key distribution system, the optical receiver comprising a plurality of optical components mounted or formed in a substrate and optically coupled by one or more hollow core waveguides formed in the substrate.

A receiver of the invention is physically robust because individual optical components are supported by the substrate. The optical components are optically coupled together by hollow core waveguides formed in the substrate. In addition, use of a substrate allows the optical components to be mounted in a much more compact arrangement than is possible using opto-mechanical mounts, or in systems where optical components are aligned manually and then glued in position. This has the important effect of reducing the alignment tolerances required for the individual optical components so that manufacturing tolerances may be reduced, allowing further improvements in productivity and unit cost. The invention may therefore provide a mechanically robust, compact and relatively inexpensive optical receiver for quantum key distribution that admits of mass production.

An optical component may be retained in an alignment slot which is formed in the substrate, intersects one of said hollow core waveguides and defines the alignment of the optical component retained therein with respect to that hollow core waveguide. This provides for the hollow core waveguide and the alignment slot to be formed by the same process, for example a machining process. All the optical components of the receiver may be retained in such slots, so that the entire layout of the receiver may be produced by a single machining process. The optical components of the receiver can then be inserted into respective slots, either manually or by an automated pick-and-place method, and simultaneously aligned: no additional step of aligning the optical components is required after they have been located in the substrate. In the case where all or some of the optical are formed in (i.e. integrated with) the substrate, alignment of the optical components is achieved simultaneously with fabrication of the substrate.

The optical receiver may have first and second receiver channels, each receiver channel being arranged to detect a photon polarised in one of a respective pair of orthogonal polarisation states and to distinguish the polarisation state of that photon, respective pairs of polarisation states being mutually inclined. This would provide an optical receiver suitable for use in QC and QKD based on the BB84 protocol for example.

The optical receiver preferably incorporates means for randomly directing an input photon to one of the receiver channels. Said means could comprise a free-space beam splitter or a fibre-optic 3 dB coupler for example, but more preferably said means are integrated with other parts of the optical receiver. For example said means may comprise an appropriately designed multimode interference (MMI) splitter either mounted in or formed integrally with the substrate. Dispersion of, and interference between, various transverse modes in a multimode optical waveguide and the exploitation of these effects to provide low-loss optical splitters, recombiners, routers, modulators and so forth are explained in European patents 0 563 065 B1, 0 563 068 B1 and 0 563 084 B1 for example. Alternatively, said means may comprise a beam splitter and an input waveguide for receiving an input photon and guiding the input photon to the beam splitter, each output of the beam splitter being optically coupled to a respective receiver channel by a respective connecting waveguide, wherein the input and connecting waveguides are hollow core waveguides formed in the substrate. The beam splitter may be retained in an alignment slot formed in the substrate, the alignment slot defining the alignment of the beam splitter retained therein with respect to the input waveguide and the connecting waveguides.

In order to correct for disturbances to the polarisation states of photons received at the optical receiver, the optical receiver may comprise a polarisation modulator which is either a discrete component device or alternatively integral, or integrated, with the input guide. Received photons could have disturbed polarisation states where they are received via one or optical fibres for example.

The first receiver channel may comprise a first polarising beam splitter and two single-photon detectors, the polarising beam splitter (PBS) having two outputs each of which is optically coupled to a respective single photon detector by a respective hollow core waveguide formed in the substrate. A photon polarised parallel to one of the optic axes of the PBS is passed with 100% probability (ignoring absorption and scattering losses and such like) to a corresponding single-photon detector. A photon polarised at 45° to the axes has a 50% probability of being passed to either single-photon detector.

In this case the second receiver channel may comprise a second polarising beam splitter and two single-photon detectors, the second polarising beam splitter having two outputs each of which is optically coupled to a respective single photon detector by a respective hollow core waveguide formed in the substrate, the second receiver channel further comprising a half-wave plate optically coupled to the input of the second polarising beam splitter by a hollow core waveguide formed in the substrate, the first and second polarising beam splitters having substantially parallel optic axes and the optic axis of the half-wave plate being inclined at substantially 22.5° to an optic axis of the second polarising beam splitter. In this arrangement of receiver channels the two pairs of orthogonal polarisation states are mutually inclined at 45°.

Preferably the hollow core waveguides are arranged to preserve the polarisation states of photons guided within them. A convenient way of achieving this is to form the hollow core waveguides with a substantially square cross section.

An optical receiver of the invention may be used as part of a free-space system. Alternatively it could be used in a system where photons are passed to the receiver via an optical fibre or fibre-optic network, in which case the optical receiver is preferably provided with an input adapted to receive an optical fibre.

In a second aspect, the invention provides an optical transmitter for a quantum key distribution system, the optical transmitter comprising a plurality of optical components mounted or formed in a substrate and optically coupled by one or more hollow core waveguides formed in the substrate. As is the case with an optical receiver of the invention, an optical transmitter of the invention may be assembled and aligned in a single process and thus admits of cost-effective mass production. Because the optical components are linked by hollow core waveguides, an optical transmitter of the invention may be realised in highly compact form, which also has the advantage of a reduction in the alignment tolerances required of the optical components. At least one of said optical components may be a mounted component retained in an alignment slot which is formed in the substrate, intersects one of said hollow core waveguides and defines the alignment of the optical component retained therein with respect to that hollow core waveguide.

If the optical transmitter is required to transmit a quantum key encoded by polarisation states of transmitted photons, the optical transmitter comprises an optical source (for example a semiconductor laser) and a polarisation modulator, the optical source and the polarisation modulator being mounted or formed in substrate and optically coupled together via one or more hollow core waveguides. The optical source and/or the polarisation modulator may be discrete components mounted in alignment slots formed in the substrate, or they may be integral with substrate itself, i.e. formed in the material of the substrate.

A hollow core waveguide formed in the substrate may also be present to guide output from the polarisation modulator to an output of the transmitter.

Since QKD involves the transmission of single photons, a optical transmitter of the invention preferably comprises some means for tapping off a portion of the optical energy propagating in the optical transmitter when it is in operation, so that the output level of the optical transmitter may be monitored and the optical source suitably adjusted. Such means for could example be a Y-coupler formed with hollow core waveguides. Preferably such means comprises a multi-mode interference (MMI) splitter (symmetric or asymmetric) either formed or mounted in the substrate and having an input optically coupled to the optical source and an output coupled to the polarisation modulator by respective hollow core waveguides formed in the substrate. Preferably the MMI splitter is formed integrally within the substrate and has hollow core input, output and multimode waveguides. Symmetric and asymmetric MMI splitters are described in detail in European patents 0 563 065 B1, 0 563 068 B1 and 0 563 084 B1 for example. Alternatively, the MMI splitter (or equivalent device) may be positioned such that it has an input optically coupled to an output of the polarisation modulator and an output coupled to an output of the optical transmitter by respective hollow core waveguides formed in the substrate.

An optical transmitter of the invention may include an intensity modulator formed in or mounted in the substrate and arranged to control the output intensity of the optical transmitter. This is useful where it is desired to operate the optical transmitter in a pulsed mode and to vary the number of photons per pulse. The intensity modulator may be a Mach-Zehnder interferometer device comprising an MMI splitter and an MMI recombiner and means for modulating the relative phase of radiation within the two arms of the interferometer.

Preferably the hollow core waveguides are arranged to preserve the polarisation states of photons guided within them. A convenient way of achieving this is to form the hollow core waveguides with a substantially square cross section.

An optical transmitter of the invention may comprise an output adapted to receive an optical fibre where a quantum key is to be transmitted over an optical fibre or fibre-optic network.

The substrate of an optical receiver or transmitter of the invention may comprise a semiconductor material, such as silicon. For example, the substrate may comprises a silicon-on-insulator (SOI) wafer. Conveniently, the substrate comprises a base portion having one or more channels formed therein, and a lid portion attached to the base portion so as to form said one or more hollow core waveguides.

Where the optical receiver/transmitter comprises mounted optical components, one or more of these optical components may be attached to the lid portion, such that when the lid and base portions are brought together these optical components are located in corresponding alignment slots in the base portion, in addition to completion of the hollow core waveguides.

The internal surfaces of one or more of the hollow core waveguides may carry a reflective coating, for example a metal coating such as gold, silver or copper. Gold has a refractive index less than that of air at wavelengths in the range 500 nm to 2.2 μm, which range encompasses the telecommunications range 1.4 μm to 1.6 μm. Copper and silver exhibit refractive indices less than unity over the ranges 560 nm to 2200 nm and 320 nm to 2480 nm respectively.

Alternatively, the reflective coating could be an all-dielectric, or metal-dielectric stack, the optical thickness of the dielectric layers determining interference effects that determine the reflective properties of the coating.

QKD, and QC in general, involves the generation and reception of single photons. If a hollow core waveguide supports only a fundamental mode (for example), a single photon launched into the waveguide will have a probability of being located at various transverse positions across the waveguide which corresponds to the classical transverse intensity distribution of a fundamental mode in that waveguide, and the term "waveguide" in this specification should be construed accordingly. It should also be noted that although the hollow core waveguides within optical receivers and transmitters of the invention may be dimensioned to provide this sort of waveguiding, they may also be dimensioned such that do not actually provide guiding, but simply act as hollow channels for providing optical communication between optical components. The substrate then acts simply as an "optical breadboard" for the optical components which form a free-space optical receiver/transmitter rather than an integrated device in which optical components are optically coupled by waveguides. The term "waveguide" in this specification should be given an expansive meaning including both of these possibilities.

Figure 5:
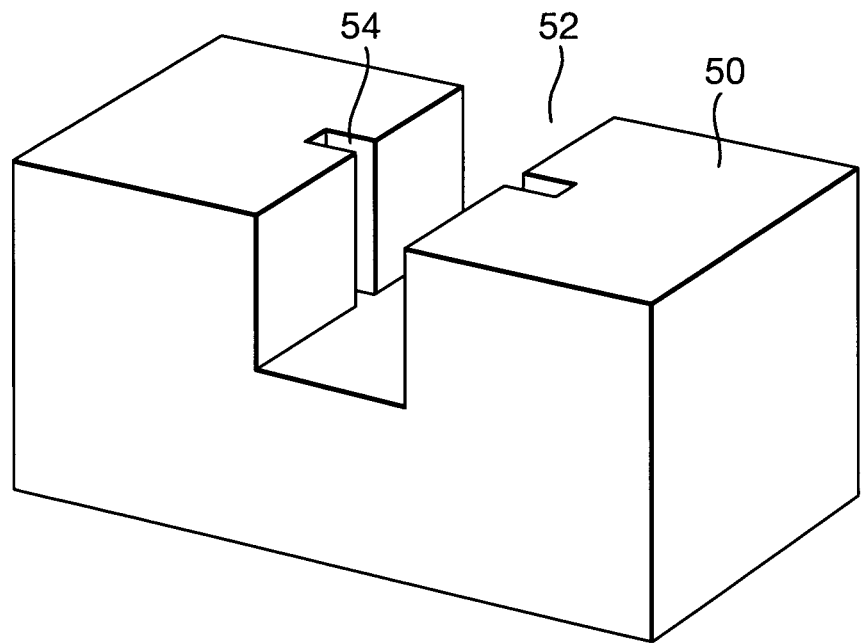
Figure 6:
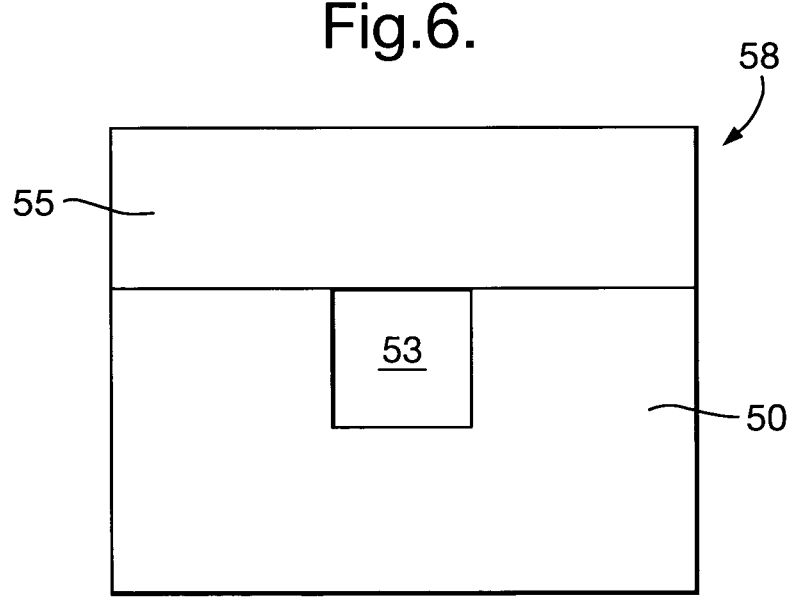
Figure 7:
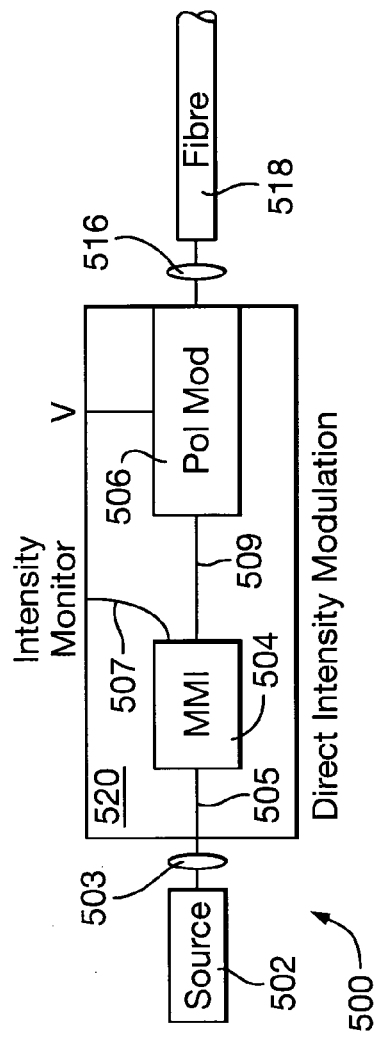
Figure 8:
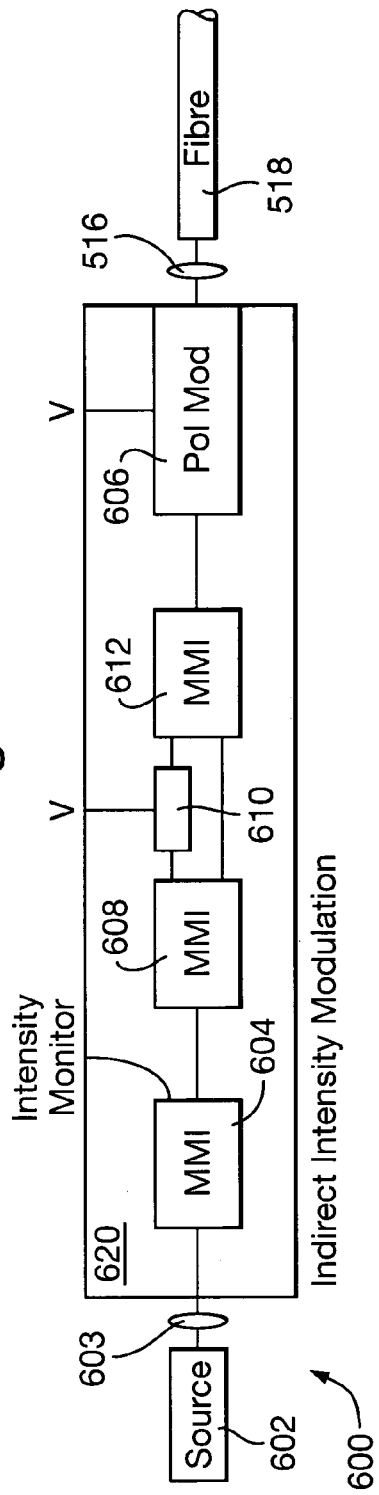
Figure 9:
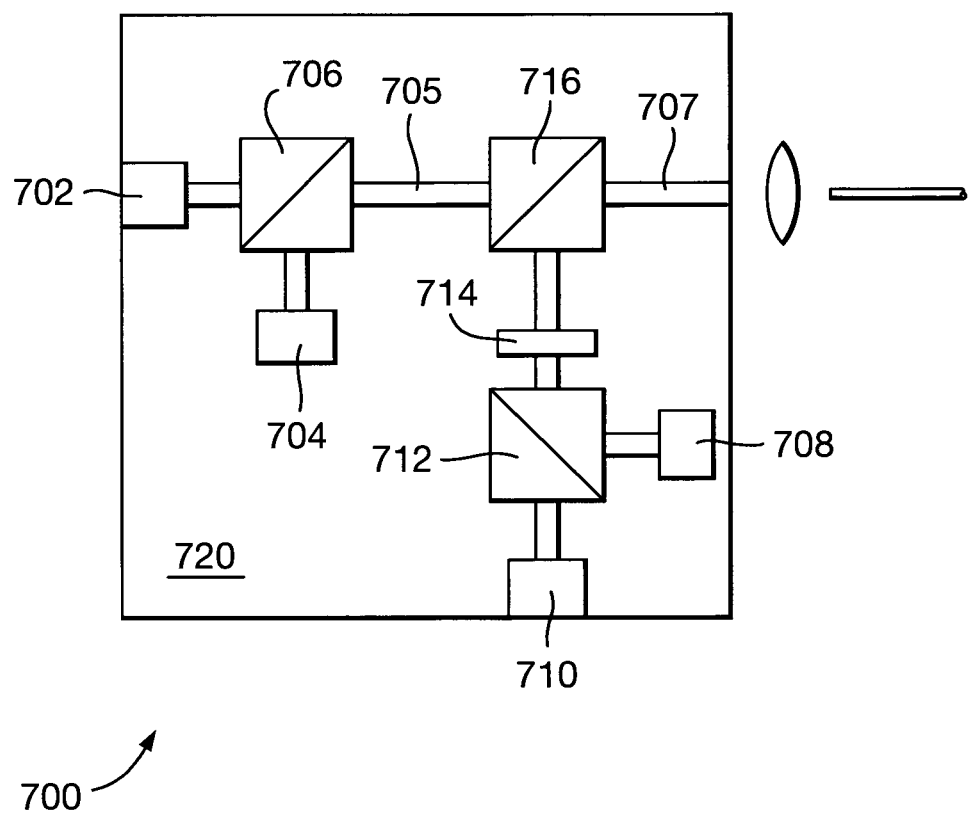

Embodiments of the invention are described below by way of example only and with reference to the accompanying drawings in which:

FIGS. 1, 2, 3 and 4 schematically illustrate optical receivers of the invention;

FIGS. 5 and 6 illustrate formation of a hollow core waveguide in a substrate and integration with an optical component; and FIGS. 7, 8 and 9 schematically illustrate optical transmitters of the invention.

In FIG. 1, an optical receiver 100 of the invention is shown schematically in plan view. The receiver 100 comprises a plurality of optical components and devices each retained within alignment slots formed in a silicon substrate 122, the components/devices being optically coupled by hollow core waveguides, such as 105, 123, which are also formed in the silicon substrate 122. Each alignment slot defines the alignment of the optical component it retains with respect to the hollow core waveguide intersected by the alignment slot.

The receiver 100 has an input 102 adapted to receive an input optical fibre 99. A lens 103 is arranged to efficiently couple light from the fibre 99 into a hollow core input waveguide 105. A wavelength filter 104 is retained in an alignment slot which intersects the input waveguide 105 and defines the alignment of the filter 104 with respect to the waveguide 105. The optical receiver 100 further comprises a beam splitter 106, a half-wave plate 120 having its optic axis inclined at 22.5° to the plane of the substrate, first 108 and second 110 polarising beam splitters (PBSs), each having an optic axis substantially normal to the plane of the substrate 122, and four single-photon detectors (SPDs) 112, 114, 116, 118, which may be single-photon avalanche diodes (SPADs) or quantum dot detectors for example. PBS 108 and SPDs 112, 114 constitute a first receiver channel. The half-wave plate 120, PBS 110 and SPDs 116, 118 constitute a second receiver channel.

In use of the optical receiver 122, single input photons input from the optical fibre 99 are coupled into the input guide 105 by the lens 103. If the photon is of a desired wavelength it passes through the wavelength filter 104 to the beam splitter 106 which directs the photon at random to one of the first and second receiver channels, whether the photon is polarised parallel or perpendicular to the plane of the substrate, or at ±45° to the plane of the substrate. If the photon passes to the first receiver channel, and it is linearly polarised parallel or perpendicular to the plane of the substrate 122, it passes to an SPD corresponding to its polarisation, i.e. if the photon is polarised perpendicular to the substrate 122, it passes to the SPD 112, and if it is polarised parallel to the plane of the substrate 122 it passes to the SPD 114. If the photon is polarised at ±45° to the plane of the substrate 122 it has a 50% chance of reaching either SPD 112 or SPD 114.

If the input photon is directed to the second receiver channel, it passes through the half-wave plate 120 before encountering the PBS 110. If the photon is linearly polarised parallel or perpendicular to the plane of the substrate 122, then on passing through the half-wave plate 120 it becomes linearly polarised at ±45° to the plane of the substrate 122: the PBS 1110 then directs the photon to either the SPD 116 or the SPD 118 with a 50% probability. If the photon is linearly polarised at ±45° to the plane of the substrate 122 then on passing through the half-wave plate 120 it will become linearly polarised either parallel or perpendicular to the plane of the substrate 122 and will be directed to one of the SPDs 116, 118 according to its polarisation state: if polarised perpendicular to the plane of the substrate 122 it passes to SPD 118 and if polarised in the plane of the substrate 122 it passes to SPD 116. The optical receiver 100 is thus able to act as a receiver which implements the BB84 protocol.

Figure 2:
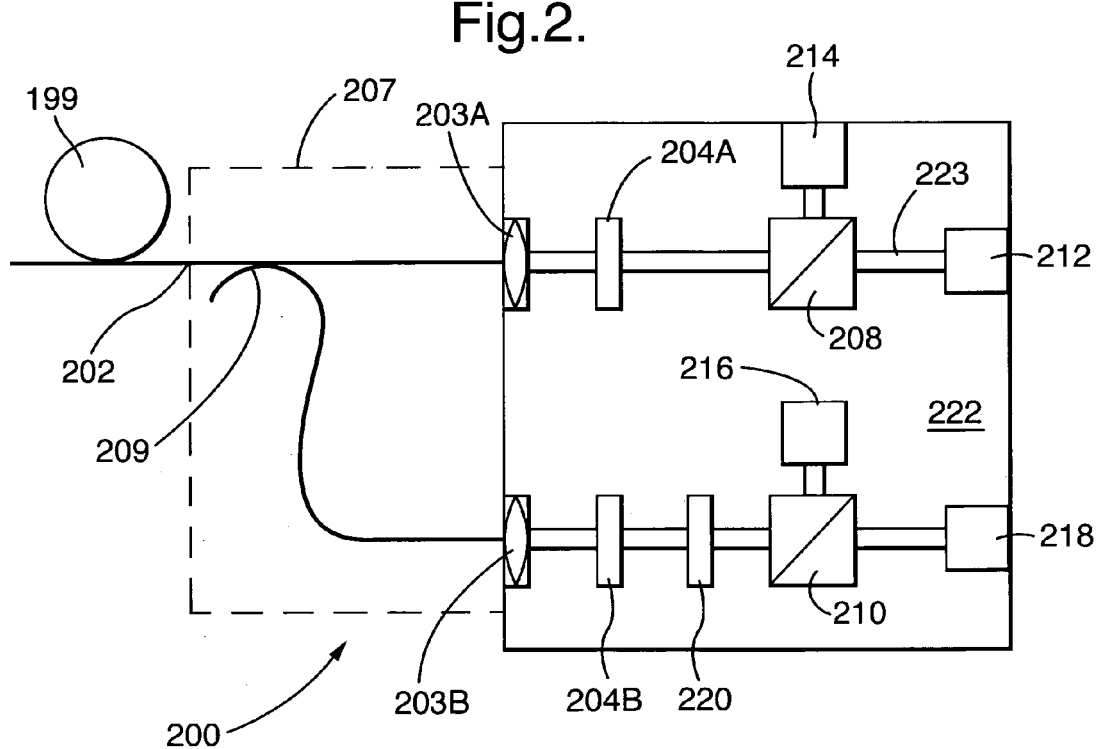

FIG. 2 shows second example optical receiver of the invention, indicated generally by 200, in which certain optical components and devices are mounted in a silicon substrate 222. Components and devices equivalent to those of the optical receiver 100 of FIG. 1 are labelled with reference signs differing by a value of 100 from those labelling equivalent parts in FIG. 1. The silicon substrate 222 mounts components 203A, 204A, 208, 212, 214 which are comprised in a first receiver channel; components 203B, 204B, 220, 210 216, 218 are comprised in a second receiver channel. Components of the two receiver channels are optically coupled by hollow core waveguides such as 223 which are formed in the substrate and which are of substantially square cross-section. In the optical receiver 200, the means 207 for directing an input photon from input fibre 199 is a fibre-optic device comprising a 3 dB coupler 209.

Operation of the optical receiver 200 of FIG. 2 is substantially the same as that of the optical receiver 100 of FIG. 1. An input photon from an input optical fibre 199 (attached to an input 202 of the optical receiver 200) is directed at random to one of the two receiver channels by the fibre-optic 3 dB coupler 209. The photon is coupled either into the first receiver channel by lens 203A or into the second receiver channel by lens 203B. The two receiver channels each have a wavelength filter 204A, 204B. The second receiver channel has a half-wave plate 220.

Figure 3:
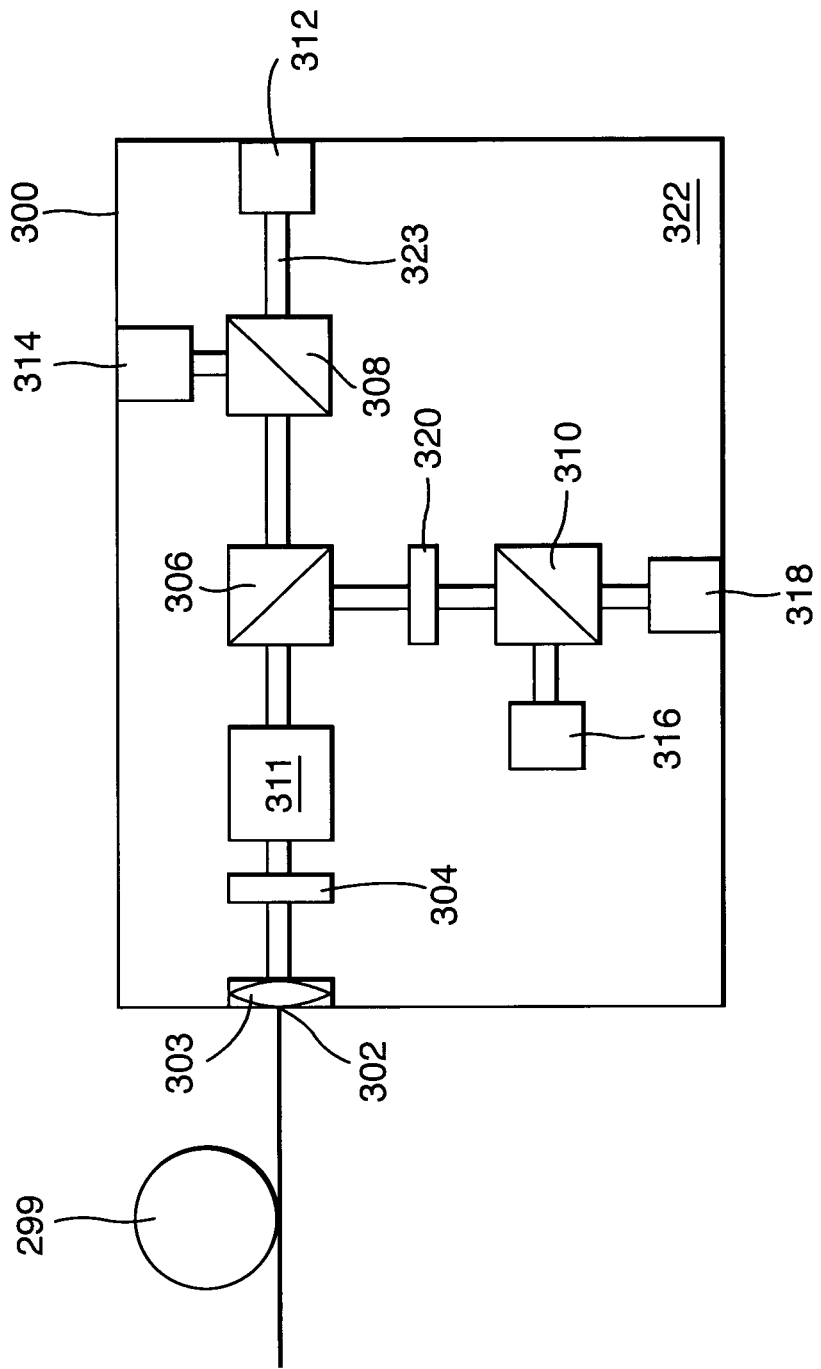

A third example optical receiver of the invention is indicated by 300 in FIG. 3. The optical receiver 300 comprises a plurality of optical components and devices mounted in alignment slots formed in a silicon substrate 322 and optically coupled together by hollow core waveguides, such as 323, which are formed in the substrate 322 and which are of substantially square cross-section. Components and devices equivalent to those of the optical receiver 100 of FIG. 1 are labelled with reference signs differing by a value of 200 from those labelling equivalent parts in FIG. 1.

Input photons from an input optical fibre 199 attached to an input 302 of the optical receiver 300 are coupled into a hollow core waveguide by a lens 303. If the input photons are of an appropriate wavelength they pass through a wavelength filter 304 to a polarisation modulator 311 retained in alignment slot formed in the substrate 322. On exiting the polarisation modulator 311 the photons are manipulated and detected as described above with respect to the optical receiver 100 of FIG. 1 and the optical receiver 200 of FIG. 2. The polarisation modulator allows the polarisation states of received photons to be corrected for disturbances caused by their passage through the optical fibre 299. The optical receiver 300 may therefore be used where transmission of photons through an optical fibre or fibre-optic network results in some disruption of the polarisation states of the photons. The optical receivers 100, 200, 300 may also be used in cases where single photons are to be received through free space.

Figure 4:
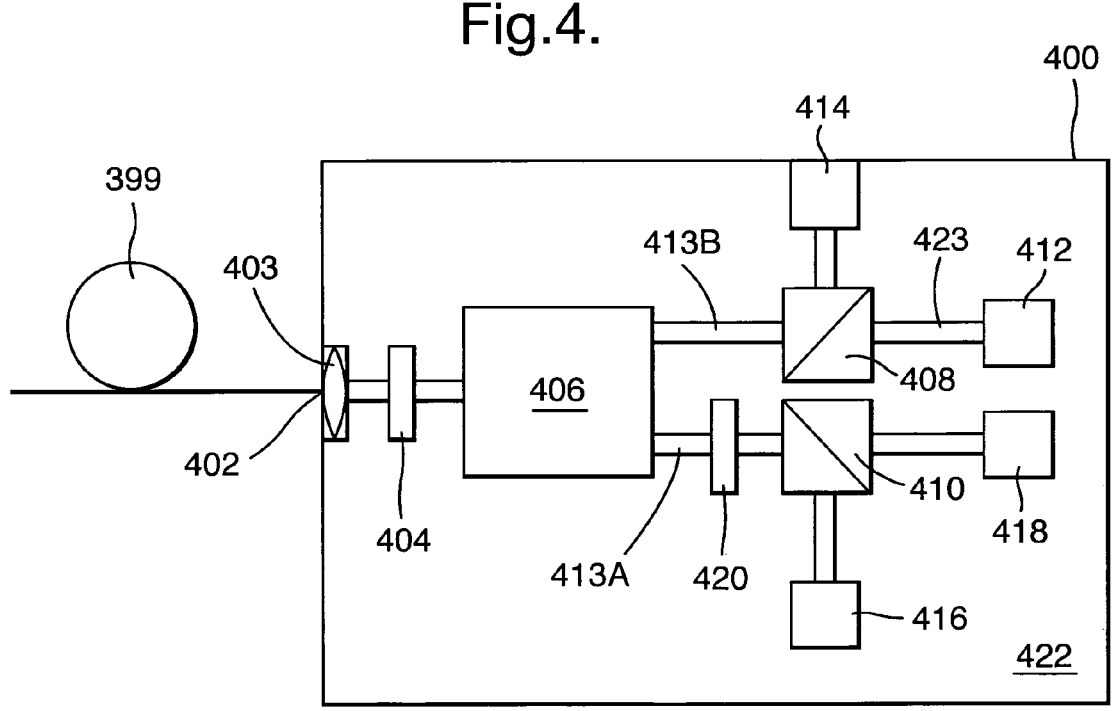

In FIG. 4, a fourth example optical receiver of the invention is indicated generally by 400. The optical receiver 400 comprises a plurality of optical devices and components retained in respective alignment slots formed in a silicon substrate 422 and optically coupled by hollow core waveguides, such as 423, of substantially square cross-section formed in the substrate 422. Components and devices equivalent to those of the optical receiver 100 of FIG. 1 are labelled with reference signs differing by a value of 300 from those labelling equivalent parts in FIG. 1. Input photons from an input optical fibre 299 attached to an input 402 of the optical receiver 400 are coupled into a hollow core waveguide via a lens 403. If they are of an appropriate wavelength the photons pass through a wavelength filter 404 to a hollow core multimode waveguide 406. The multimode waveguide 406 is also a hollow core waveguide formed in the silicon substrate 422, and has length, width and height dimensions such that it operates as a symmetric or asymmetric multimode interference (MMI) splitter. MMI splitters are described in European patent 0 563 084 B1 for example. A single photon input to the multimode waveguide 406 has a 50% probability of being input into either of hollow core waveguides 413A, 413B. The function of the multimode waveguide 406 is therefore equivalent to that of the 3 dB coupler 209 of the receiver 200 and to the beam splitters 106, 306 of receivers 100, 300. The hollow core waveguides 413A, 413B are input waveguides for first and second receiver channels respectively; photons entering these channels are manipulated and detected as described above with respect to the receivers 100, 200, 300.

FIGS. 5 and 6 illustrate how a base portion 50 and a lid portion 55 of a substrate may be machined and combined to form a hollow core waveguide 53 which is intersected by an alignment slot 54 for receiving in alignment an optical component (not shown). The base portion 50 may be machined in a single process to form both a channel 52 and the alignment slot 54. The optical component may then be inserted into the alignment slot 54 and the lid portion 55 applied to the base portion 50 to form the hollow core waveguide 53. The alignment of the optical component with respect to the channel 52 (and ultimately to the hollow core waveguide 53 when retained in the alignment slot 54) is defined by the angle at which the slot 54 intersects the channel 52. Therefore when an optical component is placed in the alignment slot 54 it is simultaneously aligned with respect to the channel 52, and with respect to the hollow core waveguide 53 when the lid portion 55 is applied to the base portion 50. The optical component could alternatively be attached to the lid portion so that the step of applying the lid portion 55 to the base portion 50 also inserts the optical component in the alignment slot 54 and aligns it with respect to the channel 52.

FIG. 7 shows an optical transmitter of the invention, indicted generally by 500. The optical transmitter 500 comprises an optical source 502 (e.g. a semiconductor laser), a coupling lens 503 and a substrate 520 comprising a symmetric or asymmetric MMI splitter 504 and a polarisation modulator 506. Output from the receiver 500 may be coupled via a lens 516 to an optical fibre 518 for transmission over a fibre-optic network to an optical receiver, for example one of the optical receivers 100, 200, 300, 400 of FIGS. 1 to 4. The MMI splitter 504 is a hollow core multimode waveguide formed in the substrate 520 and has hollow core input 505 and output 507, 509 waveguides which are also formed in the substrate. The polarisation modulator 506 may be a discrete device located in an alignment slot or it may be formed integrally with the substrate 520.

In operation, light from the optical source 502 is coupled into the hollow core waveguide 505 and passes to the MMI splitter 504. A portion of the light passes to the waveguide 507 and may be monitored for intensity. The remainder of the light passes via the waveguide 509 to the polarisation modulator 506. By monitoring the intensity of radiation in the waveguide 507, the output of the source 502 may be controlled so that it emits single photons. The polarisation modulator may be operated so that single photons output from the transmitter 500 have various polarisation states required for QKD, for example QKD using the BB84 protocol. The optical source may alternatively be located in the substrate and coupled to the input of the MMI splitter 504 by a hollow core waveguide formed in the substrate 520. The optical source, MMI splitter and polarisation modulator could thus be comprised in a single fully integrated optical transmitter. The polarisation modulator 506 may be operated such that an individual photon is given a polarisation state which has a degree of ellipticity such that after passing through an optical fibre or fibre-optic network to a receiver it is has a desired linear polarisation state. In an alternative embodiment, the polarisation modulator may follow the MMI splitter rather than preceding it.

FIG. 8 shows a second example optical transmitter of the invention, indicated generally by 600. The transmitter comprises a pulsed optical source 602, a coupling lens 603 and a silicon substrate 620 in which are formed hollow core MMI splitters 604, 608, an MIMI recombiner 612 and a phase shifting device 610. The components/devices formed or mounted in the substrate 620 are optically coupled by hollow core waveguides formed in the substrate 620. In operation, radiation from the pulsed optical source 602 is coupled into an input waveguide of MMI splitter 604 at which a portion is tapped off for intensity monitoring. The remainder passes to MMI splitter 608, which, together with the phase-shifting element 610 and MMI recombiner 612, form an intensity modulator in the form of a Mach-Zehnder interferometer. The intensity level of the radiation tapped off by MMI splitter 604 may be observed and the source 602 adjusted so that it provides single photons. The intensity modulator may be operated to adjust the number of photons per pulse output by the transmitter 600, as is required in certain modes of performing QKD involving decoy pulses. The optical source may alternatively be mounted or formed in the substrate to produce a fully integrated optical transmitter.

FIG. 9 shows a third example optical transmitter 700 of the invention, the transmitter 700 comprising various optical devices/components formed in or mounted in a silicon substrate 720 and optically coupled by hollow core waveguides, such as 705, 707 formed in the substrate 720. The optical transmitter 700 comprises optical sources 702, 710 which generate single photons polarised perpendicular to the plane of the substrate 720, and optical sources 704, 708 which generate single photons polarised in the plane of the substrate. Polarising beam splitters 706, 712 couple these photons to a beam splitter 716. Photons output from sources 708, 710 pass through a half-waveplate 714 such that they are linearly polarised at ±45° before reaching the beam splitter 716. Any photon reaching the beam splitter 716 has a 50% chance of passing to output waveguide 707.

The invention claimed is:

1. An optical receiver for a quantum key distribution system, the optical receiver comprising a plurality of optical components mounted or formed in a substrate and optically coupled by one or more hollow core waveguides formed in the substrate, wherein
    at least one of said optical components is a mounted component retained in an alignment slot, wherein:
    (i) the alignment slot is formed in the substrate,
    (ii) a longitudinal axis of the alignment slot is a longest dimension of the alignment slot that transversely intersects a longitudinal section of one of said hollow core waveguides, and
    (iii) the alignment slot defines an alignment of the optical component retained within the alignment slot with respect to said hollow core waveguide, and
    the at least one of said optical components is inserted into the alignment slot.

2. The optical receiver according to claim 1, wherein:
    (i) the alignment slot comprises a first portion and a second portion that are formed in the substrate,
    (ii) the first portion and the second portion of the alignment slot share the longitudinal axis and are separated by the one of said hollow core wave guides,
    (iii) the first portion and the second portion of the alignment slot retain the at least one optical component, and (iv) the alignment of the optical component retained within the alignment slot is defined by an angle at which the alignment slot transversely intersects the one of said hollow wave guides.

3. The optical receiver according to claim 1, the optical receiver comprising first and second receiver channels, each receiver channel being arranged to detect a photon polarised in one of a respective pair of orthogonal polarisation states and to distinguish the polarisation state of that photon, respective pairs of polarisation states being mutually inclined.

4. The optical receiver according to claim 3, the optical receiver comprising means for randomly directing an input photon to one of the receiver channels.

5. The optical receiver according to claim 4, wherein said means is a multimode interference (MMI) device formed or mounted in the substrate.

6. The optical receiver according to claim 4, wherein said means comprises a beam splitter and an input waveguide for receiving an input photon and guiding the input photon to the beam splitter, each output of the beam splitter being optically coupled to a respective receiver channel by a respective connecting waveguide, wherein the input and connecting waveguides are hollow core waveguides formed in the substrate.

7. The optical receiver according to claim 6, further comprising a polarisation modulator, the polarisation modulator being retained within an alignment slot which intersects the input waveguide.

8. The optical receiver according to claim 3, wherein the first receiver channel comprises a first polarising beam splitter and two single-photon detectors, the polarising beam splitter having two outputs each of which is optically coupled to a respective single photon detector by a respective hollow core waveguide formed in the substrate.

9. The optical receiver according to claim 8, wherein the second receiver channel comprises a second polarising beam splitter and two single-photon detectors, the second polarising beam splitter having two outputs each of which is optically coupled to a respective single photon detector by a respective hollow core waveguide formed in the substrate, and wherein the second receiver channel further comprises a half-wave plate optically coupled to the input of the second polarising beam splitter by a hollow core waveguide formed in the substrate, the first and second polarising beam splitters having substantially parallel optic axes and the optic axis of the half-wave plate being inclined at substantially 22.5° to an optic axis of the second polarising beam splitter.

10. An optical transmitter for a quantum key distribution system, the optical transmitter comprising a plurality of optical components mounted or formed in a substrate and optically coupled by one or more hollow core waveguides formed in the substrate, wherein
at least one of said optical components is a mounted component retained in an alignment slot, wherein:
(i) the alignment slot is formed in the substrate,
(ii) a longitudinal axis of the alignment slot is a longest dimension of the alignment slot that transversely intersects a longitudinal section of one of said hollow core waveguides, and
(iii) the alignment slot defines an alignment of the optical component retained within the alignment slot with respect to said hollow core waveguide, and
the at least one of said optical components is inserted into the alignment slot.

11. The optical transmitter according to claim 10, the optical transmitter comprising an optical source and a polarisation modulator, the optical source and the polarisation modulator being mounted or formed in the substrate and optically coupled by one or more hollow core waveguides formed in the substrate.

12. The optical transmitter according to claim 11, further comprising one or more hollow core waveguides formed in the substrate and arranged to optically couple an output of the polarisation modulator to an output of the optical transmitter, the optical transmitter further comprising means for tapping off a portion of the optical energy propagating within the optical the optical transmitter when in operation.

13. The optical transmitter according to claim 12, wherein said means comprises a multimode interference (MMI) symmetric or asymmetric splitter mounted or formed in the substrate and having an input optically coupled to the optical source and an output optically coupled to the polarisation modulation by respective hollow core waveguides formed in the substrate.

14. The optical transmitter according to claim 12, wherein said means comprises a multimode interference (MMI) symmetric or asymmetric splitter mounted or formed in the substrate and having an input optically coupled to an output of the polarisation modulator and an output optically coupled to an output of the optical transmitter by respective hollow core waveguides formed in the substrate.

15. The optical transmitter according to claim 10, further comprising an intensity modulator mounted or formed in the substrate and arranged to control the output intensity of the optical transmitter.

16. The optical transmitter according claim 10, wherein the intensity modulator is a Mach-Zehnder interferometer device comprising an MMI splitter and an MMI recombiner.

17. The optical receiver according to claim 1, wherein the substrate comprises a base portion having one or more square cross-section channels formed therein, and wherein a lid portion is additionally provided to form said one or more hollow core waveguides.

18. The optical receiver according to claim 17, wherein one or more of said optical components are attached to the lid portion.

19. A base portion for an optical receiver according to claim 1, the base portion comprising a plurality of alignment slots and connecting hollow channels formed in a substrate, each alignment slot being adapted to receive in alignment an optical component.

20. A base portion for an optical transmitter according to claim 10, the base portion comprising a plurality of alignment slots and connecting hollow channels formed in a substrate, each alignment slot being adapted to receive in alignment an optical component.

* * * * *